US008104224B1

(12) United States Patent
Doss

(10) Patent No.: US 8,104,224 B1
(45) Date of Patent: Jan. 31, 2012

(54) ANT EXTERMINATOR APPARATUS

(76) Inventor: Munir H. Doss, Sandy Springs, GA (US)

( * ) Notice: Subject to any disclaimer, the term of this patent is extended or adjusted under 35 U.S.C. 154(b) by 0 days.

(21) Appl. No.: 12/796,400

(22) Filed: Jun. 8, 2010

(51) Int. Cl.
*A01M 1/20* (2006.01)
(52) U.S. Cl. ............................................... 43/131
(58) Field of Classification Search ............ 43/131
See application file for complete search history.

(56) References Cited

U.S. PATENT DOCUMENTS

| | | | | |
|---|---|---|---|---|
| 378,509 A | * | 2/1888 | Kibler | 43/131 |
| 794,637 A | * | 7/1905 | Park et al. | 43/131 |
| 1,103,032 A | * | 7/1914 | Childress | 43/131 |
| 1,118,508 A | * | 11/1914 | Miller | 43/131 |
| 1,186,178 A | * | 6/1916 | French | 43/131 |
| 1,427,723 A | * | 8/1922 | Clausen | 43/131 |
| 2,157,953 A | * | 5/1939 | De Long | 43/131 |
| 2,837,861 A | * | 6/1958 | Graham, Sr. | 43/131 |
| 4,453,337 A | * | 6/1984 | Williams | 43/131 |
| 4,782,621 A | * | 11/1988 | Wissman | 43/131 |
| 5,379,545 A | * | 1/1995 | Gall et al. | 43/131 |
| 5,490,349 A | * | 2/1996 | Muramatsu | 43/121 |
| 5,522,172 A | * | 6/1996 | Clark | 43/131 |
| 5,746,021 A | * | 5/1998 | Green | 43/131 |
| 5,802,761 A | * | 9/1998 | Demarest et al. | 43/131 |
| 5,870,853 A | * | 2/1999 | Williams | 43/131 |
| 5,875,586 A | * | 3/1999 | Ballard et al. | 43/131 |
| 5,960,585 A | * | 10/1999 | Demarest et al. | 43/131 |
| 5,966,863 A | * | 10/1999 | Payton et al. | 43/131 |
| 6,014,834 A | * | 1/2000 | Ferland | 43/131 |
| 6,041,542 A | * | 3/2000 | Payton et al. | 43/131 |
| 6,195,933 B1 | * | 3/2001 | Woodruff | 43/131 |
| 6,272,791 B1 | * | 8/2001 | Pleasants | 43/131 |
| 6,370,813 B1 | * | 4/2002 | Nelson et al. | 43/131 |
| 6,374,536 B1 | * | 4/2002 | Washburn | 43/131 |
| 6,467,216 B2 | * | 10/2002 | McManus et al. | 43/131 |
| 6,532,696 B2 | * | 3/2003 | Clark et al. | 43/131 |
| 6,618,983 B1 | * | 9/2003 | Spragins | 43/131 |
| 6,651,378 B2 | * | 11/2003 | Baker | 43/131 |
| 7,043,873 B2 | * | 5/2006 | Westphal et al. | 43/131 |
| 7,204,054 B2 | * | 4/2007 | Mayo et al. | 43/131 |
| 7,325,358 B1 | * | 2/2008 | Chalupsky et al. | 43/131 |
| 7,377,072 B2 | * | 5/2008 | Meier et al. | 43/131 |
| 7,540,111 B2 | * | 6/2009 | Kraatz | 43/131 |
| 7,987,629 B2 | * | 8/2011 | Harper | 43/131 |
| 2002/0046483 A1 | * | 4/2002 | Snell et al. | 43/131 |
| 2005/0000147 A1 | | 1/2005 | Westphal et al. | |
| 2005/0097811 A1 | * | 5/2005 | Scribner | 43/131 |
| 2008/0104882 A1 | * | 5/2008 | Bernard et al. | 43/131 |
| 2008/0307695 A1 | * | 12/2008 | Bernard | 43/131 |
| 2010/0319239 A1 | * | 12/2010 | Kirkland et al. | 43/131 |
| 2010/0325940 A1 | * | 12/2010 | Pryor et al. | 43/131 |

FOREIGN PATENT DOCUMENTS

| | | | | |
|---|---|---|---|---|
| GB | 2346536 A | * | 8/2000 | |
| JP | 2001136888 A | * | 5/2001 | |
| JP | 2011098945 A | * | 5/2011 | |

* cited by examiner

*Primary Examiner* — Darren W Ark

(57) ABSTRACT

The ant exterminator apparatus provides reservoirs for 3 different types of bait to thereby best lure pests, especially ants. The overlapping top removably fits over the base to allow pest entrance and egress. The top provides visible and mechanical base access without top removal and also negates bait spillage and exterior contamination of the apparatus by bait, thereby further ensuring against code violations. The apparatus is effectively and legally used both exteriorly and interiorly with respect to structures.

10 Claims, 5 Drawing Sheets

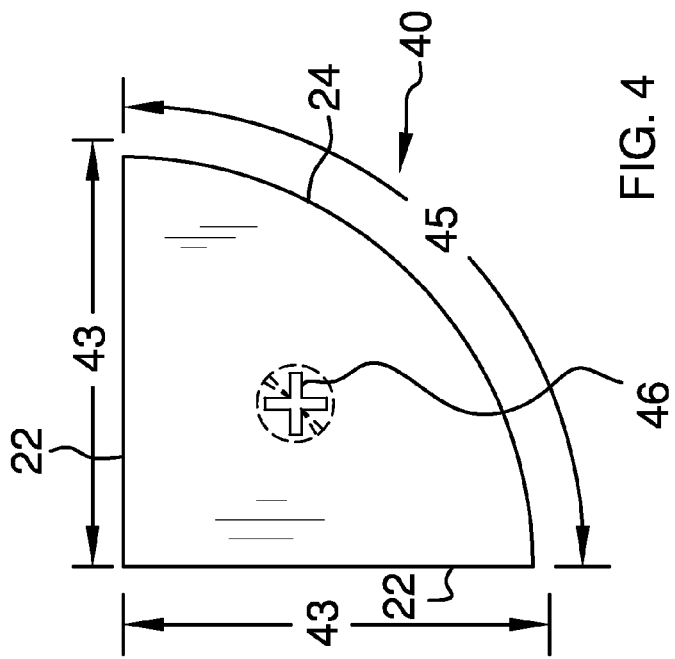
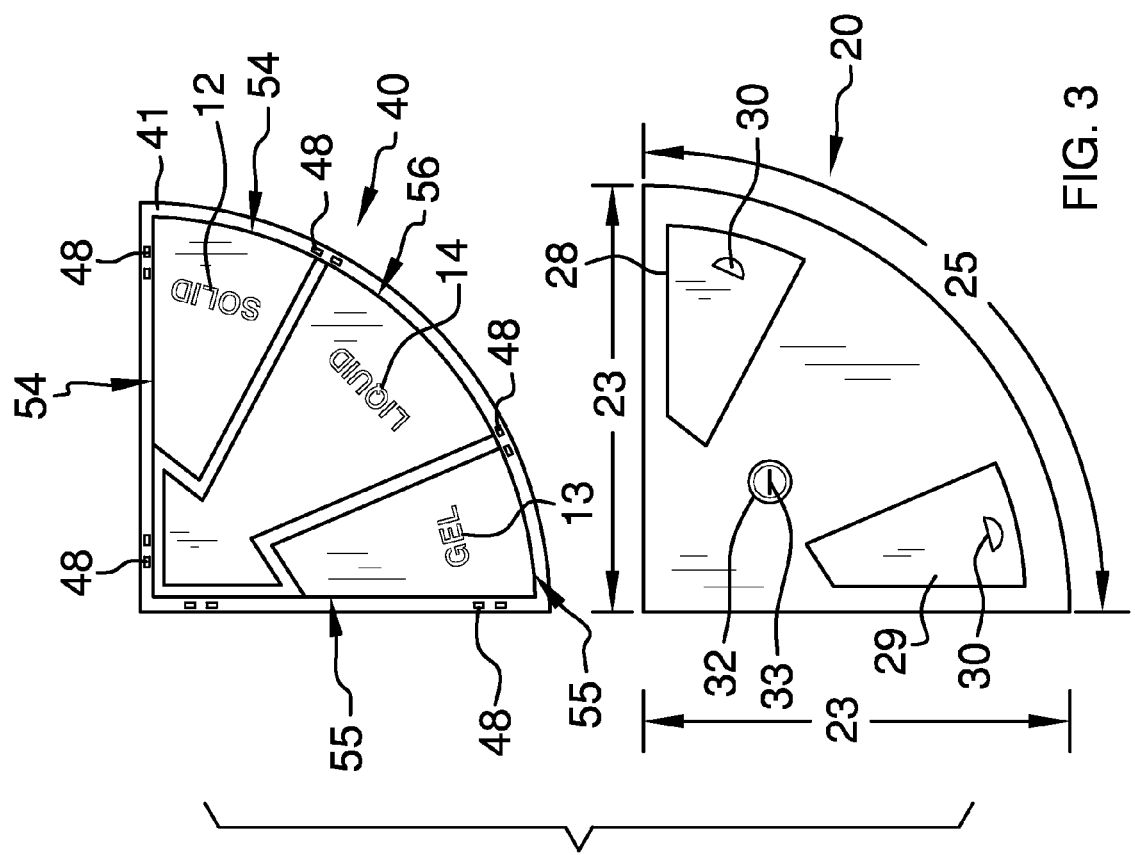

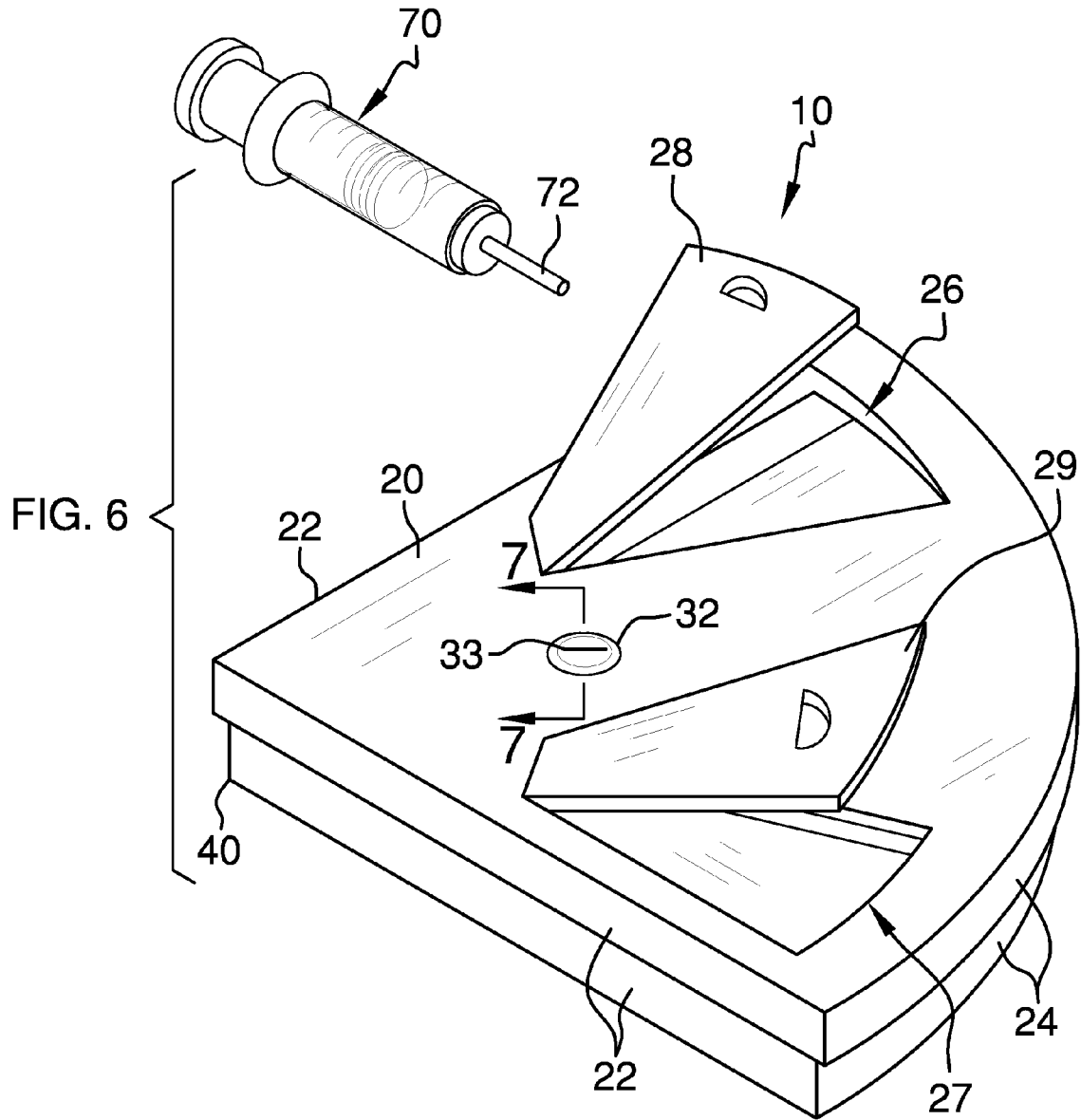
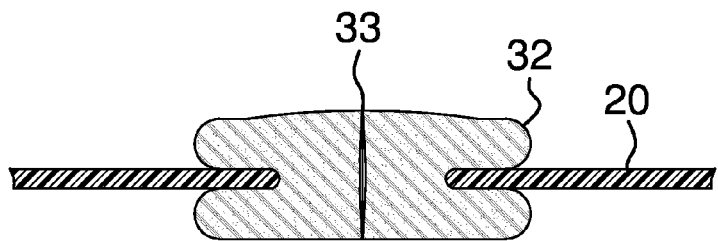
FIG. 7

ANT EXTERMINATOR APPARATUS

BACKGROUND OF THE INVENTION

Bugs are a constant problem to those of us within any of a host of buildings, whether a home, office, commercial building, or any other structure that suffers from insect and other bug invasions. Ants are particularly difficult to control and eradicate and have long posed a sometimes impossible challenge. The challenge of ant control has been exacerbated by recently banned measures, especially in restaurants and other commercial and private structures and especially also where pets and children might risk exposure to extermination measures. Another issue is that exterior and interior ant extermination measures differ, and exterior devices are typically not allowed in interior use unless modified. Additionally, the ideal exterior extermination device may require some form of anchoring mechanism for removably affixing the device within soil. In the past, effective exterior devices required self-modification to be used interiorly. Any shortcomings to modified devices, though, are subject to health code violations and to failure. Added to these issues is the fact that ants as well as some other pests are most effectively eliminated by a combination of baits, including solid, gel, and liquid forms. And, a properly designed extermination apparatus should unobtrusively fit in a variety of spaces and also be easily inspected and filled with the bait used, without risk of bait spillage. The present apparatus uniquely addresses and solves the above-listed problems.

FIELD OF THE INVENTION

The ant exterminator apparatus relates to bug extermination devices and more especially to an extermination device that is especially effective with ants.

SUMMARY OF THE INVENTION

The general purpose of the ant exterminator apparatus, described subsequently in greater detail, is to provide an ant exterminator apparatus which has many novel features that result in an improved ant exterminator apparatus which is not anticipated, rendered obvious, suggested, or even implied by prior art, either alone or in combination thereof.

To attain this, the ant exterminator apparatus may be provided with base and top in triangulated form. The triangulated embodiment best provides for unobtrusive fit within corners, whether indoors or outdoors. The base and top may also be provided in other shapes. The apparatus provides further for unobtrusive placement due to the important dimensions of the top and base. The top and base dimensions are further key in providing the proper overlap of top over bottom to allow pest ingress and egress. Advantages of multiple baits ensure effectiveness against many pests and especially against ants. With separate liquid, gel, and solid bait reservoirs, the apparatus provides for luring pests as well as do solid, gelatinous, and liquid food items often pursued by the same pests. As noted, access for the troublesome pests is provided by the overlapped fit of the top to the base, and the fasteners importantly retain the top above the base. The top, which is preferably opaque because exposure to direct sunlight breaks down bait, provides for filling all three reservoirs without removal of the top from the base. Lids may further provide for bait inspection without top removal. Importantly, the arrowhead shaped central reservoir provides for liquid bait exposure to all sides of the apparatus.

The apparatus need not be modified to properly provide for indoor and outdoor use. Removal or addition of the barbed spike allows rapid adaptation to either environment. The barbed spike provides for secure implant into penetrable surfaces to support the apparatus. The access of the rubberized plug importantly provides for liquid bait to be injected through the top and into the central reservoir, then closes to prevent liquid bait spill or contamination of the top, thereby further ensuring conformation to health regulations. The lids provide the same advantages for gel and solid bait filling of the other reservoirs.

Thus has been broadly outlined the more important features of the improved ant exterminator apparatus so that the detailed description thereof that follows may be better understood and in order that the present contribution to the art may be better appreciated.

An object of the ant exterminator apparatus is to exterminate pests.

Another object of the ant exterminator apparatus is to provide for both exterior and interior use.

A further object of the ant exterminator apparatus is to meet extermination regulations.

An added object of the ant exterminator apparatus is to be especially effective in ant eradication.

And, an object of the ant exterminator apparatus is to fit unobtrusively in a variety of locations.

Another object of the ant exterminator apparatus is to fit corner locations.

Yet another object of the ant exterminator apparatus is to provide for a variety of bait types.

Still another object of the ant exterminator apparatus is to prevent spillage of bait.

Another object of the ant exterminator apparatus is to provide for easy inspection of bait.

Another object of the ant exterminator apparatus is to provide for selective removable anchoring within soil of other penetrable material.

These together with additional objects, features and advantages of the improved ant exterminator apparatus will be readily apparent to those of ordinary skill in the art upon reading the following detailed description of presently preferred, but nonetheless illustrative, embodiments of the improved ant exterminator apparatus when taken in conjunction with the accompanying drawings.

In this respect, before explaining the current embodiments of the improved ant exterminator apparatus in detail, it is to be understood that the ant exterminator apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved ant exterminator apparatus. It is therefore important that the claims be regarded as including such equivalent constructions insofar as they do not depart from the spirit and scope of the ant exterminator apparatus. It is also to be understood that the phraseology and terminology employed herein are for purposes of description and should not be regarded as limiting.

BRIEF DESCRIPTION OF THE DRAWINGS

FIG. 3 is a top plan view of the top separated from the base.

FIG. 4 is a bottom plan view of the base.

FIG. 6 is a top perspective view of the top installed upon the base and bait syringe prepared for liquid bait injection.

FIG. 7 is a partial cross sectional view of FIG. 6, taken along the line 7-7.

DETAILED DESCRIPTION OF THE DRAWINGS

With reference now to the drawings, and in particular FIGS. 1 through 7 thereof, the principles and concepts of the ant exterminator apparatus generally designated by the reference number 10 will be described.

Figure 1:
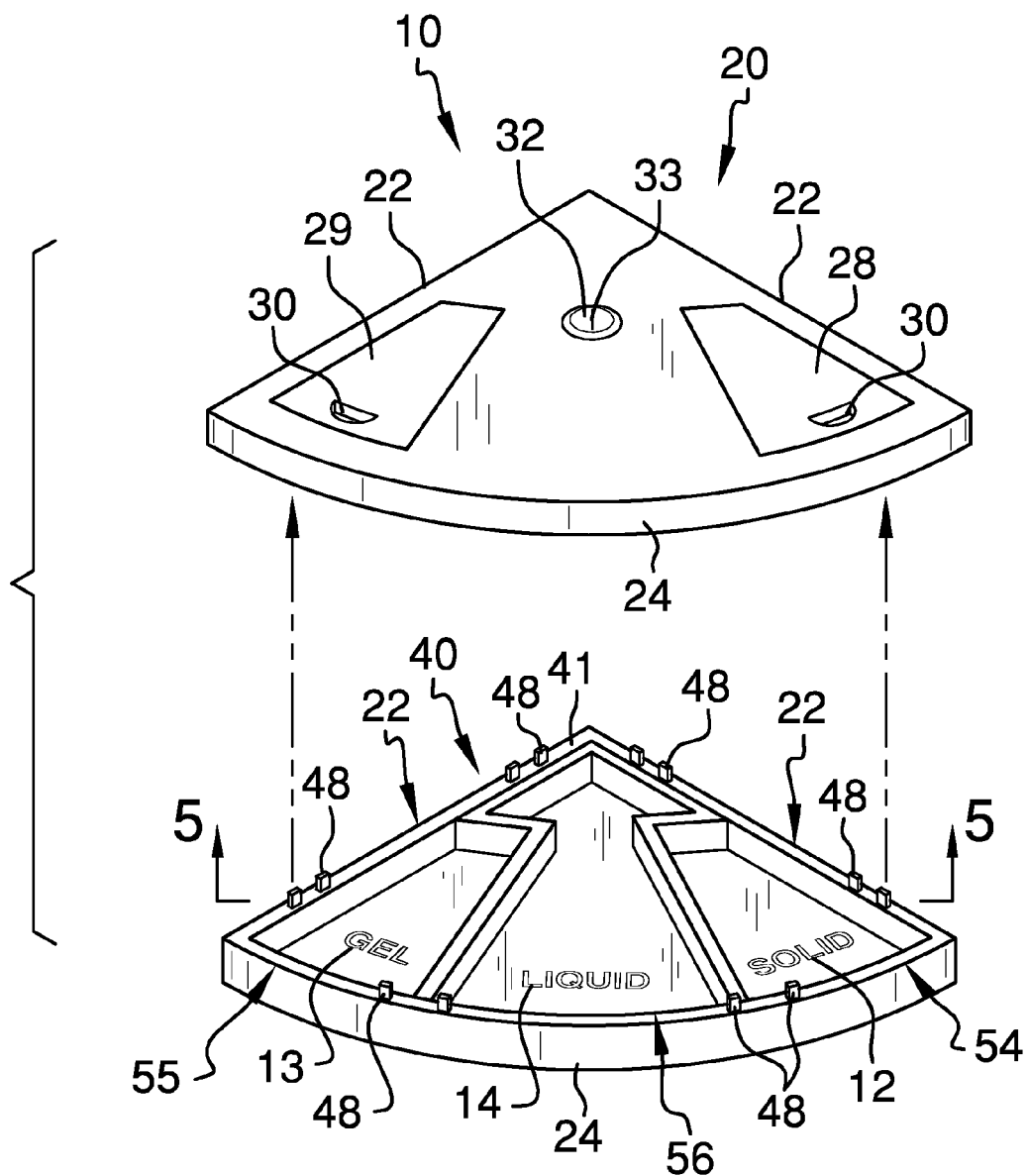
FIG. 1 is a perspective view with top separated from the base.

Referring to FIG. 1, the apparatus 10 is partially comprised of a triangulated top 20 removably covering a triangulated base 40.

Referring to FIG. 4 the triangulated base 40 has two adjacent straight edges 22 with a straight edge length 43 of about 6.5 inches. The curved edge 24 connects the straight edges 22. The curved edge 24 has a base curved edge length 45 of about 7.5 inches.

Referring again to FIG. 1, the plurality of spaced apart fasteners 48 is disposed upwardly around the perimeter 41 of the base 40.

Referring to FIGS. 1 and 3, the pair of spaced apart mirror image reservoirs is disposed upwardly within the base 40. The mirror image reservoirs comprise the first reservoir 54 disposed adjacent to one straight edge 22 and the second reservoir 55 disposed adjacent to the other straight edge 22. The arrowhead shaped central reservoir 56 is disposed upwardly within the base 40 between the mirror image reservoirs.

Figure 2:
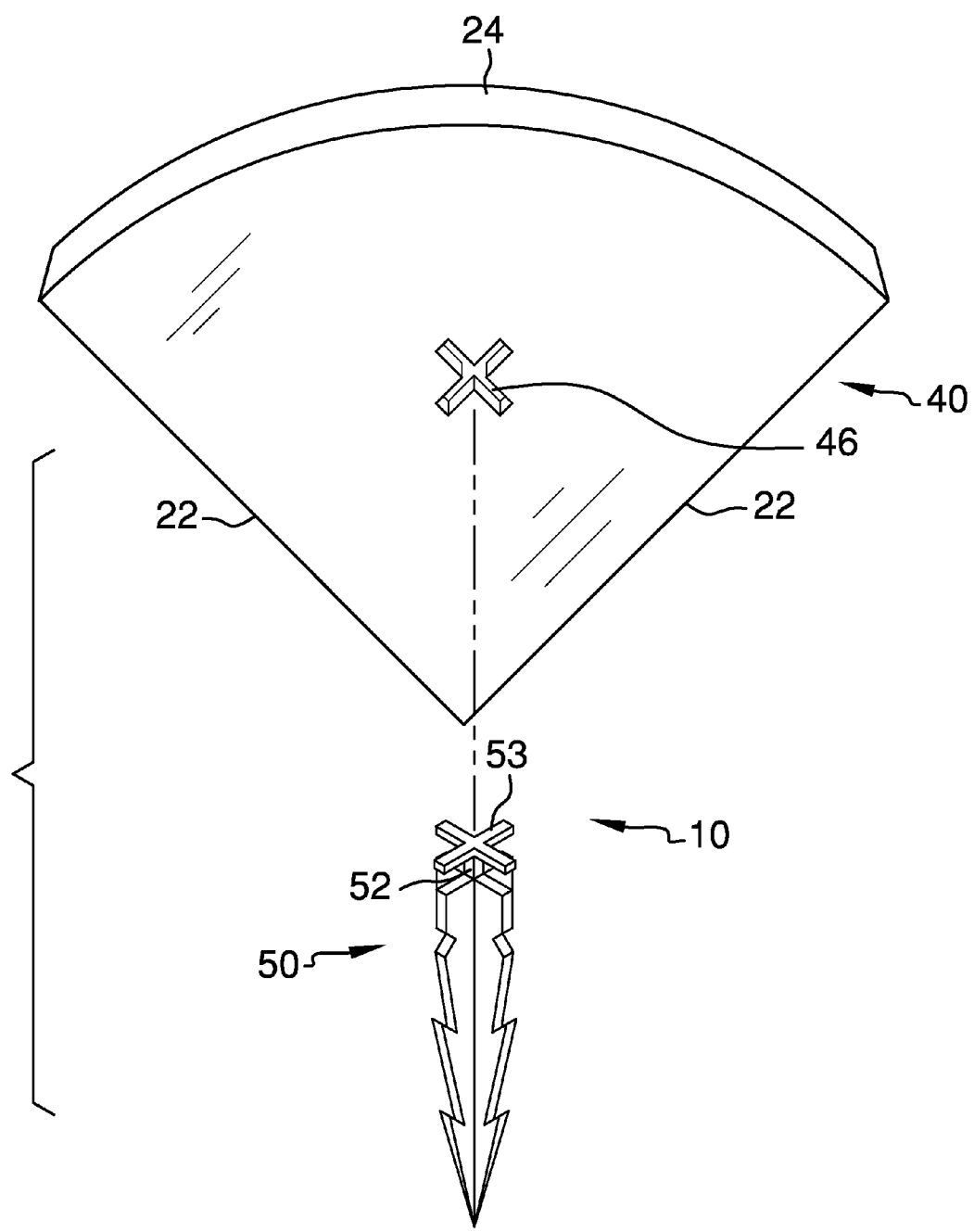
FIG. 2 is a bottom perspective view of the base with barbed stake removed.
Figure 5:
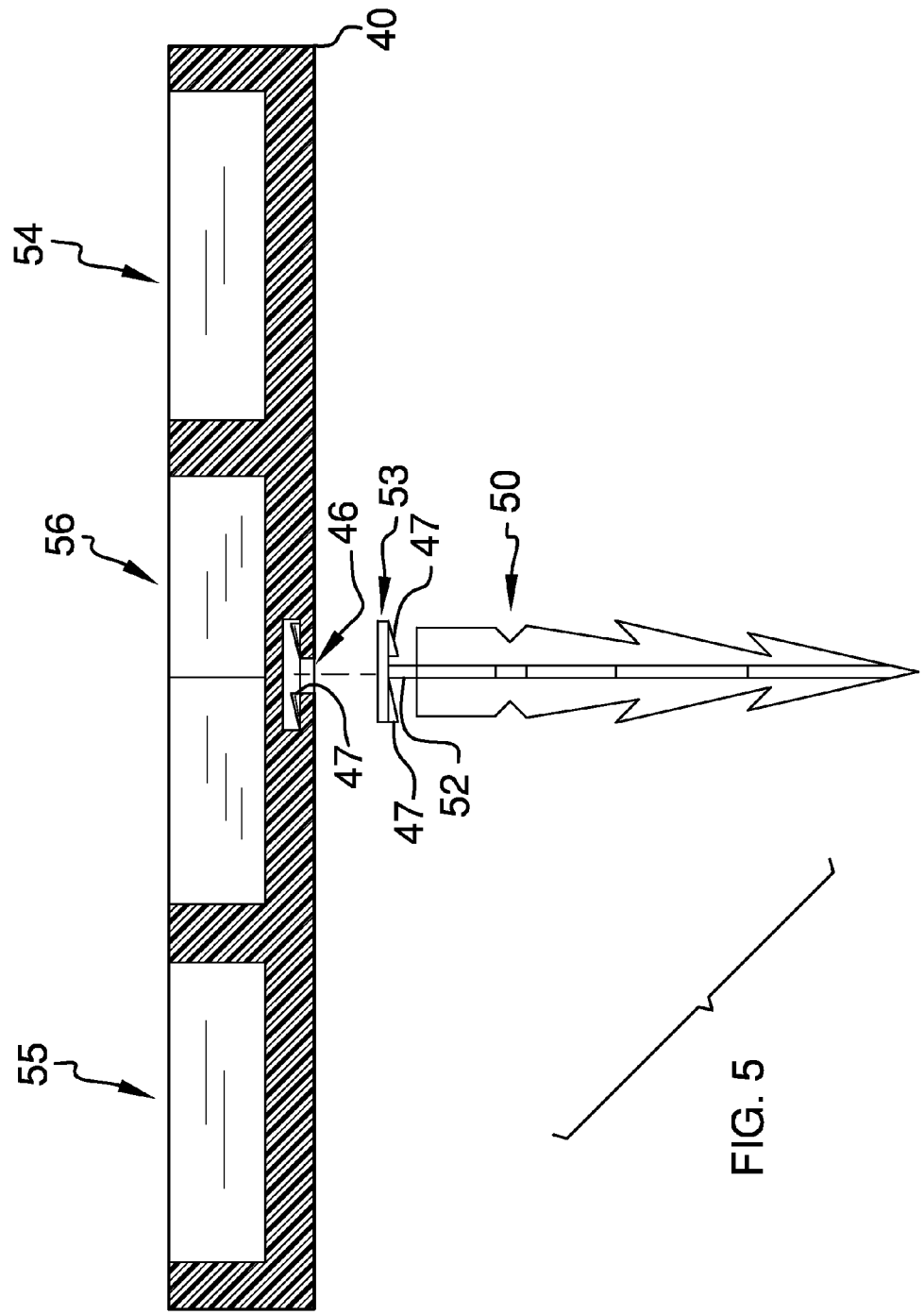
FIG. 5 is a cross sectional view of the base of FIG. 1, taken along the line 5-5.

Referring to FIG. 2, the t-receptacle 46 is disposed downwardly and centrally within the base 40. The t-receptacle 46 has a plurality of twist locks 47 disposed within. The barbed stake 50 has an upwardly connected neck 52 with t-insert 53. A plurality of twist locks 47 is disposed on the t-insert 53. The t-insert 53 is selectively locked within the t-receptacle 46 via the twist locks 47. A continued twist unlocks the twist locks 47 allowing removal of the t-insert 53 from the t-receptacle 46. The barbed stake 50 is an important feature for outdoor apparatus 10 use and at the same time an important feature, with the barbed stake 50 removed, for indoor use of the apparatus 10.

Referring to FIG. 6, the triangulated top 20 is removably fitted atop the base 40 and selectively retained and held slightly above the base 40 by the base 40 fasteners 48.

Referring to FIG. 3, the top 20 has two adjacent straight edges 22 with an edge length 23 of about 7 inches. A curved edge 24 connects the straight edges 22. The curved edge 24 has a curved edge length 25 of about 8 inches.

Referring to FIG. 6, the pair of mirror image cutouts is disposed within the top 20. The cutouts comprise the first cutout 26 positioned above the first reservoir 54 and the second cutout 27 positioned above the second reservoir 55. The cutouts are positioned above the reservoirs with the top 20 placed atop the base 40. The pair of mirror image lids is fitted within the top 20. The lids comprise the first lid 28 removably fitted to the first cutout 26 and the second lid 29 removably fitted to the second cutout 27. An indention 30 is disposed in each lid to aid in lid lift.

Referring to FIG. 7, the rubberized plug 32 is disposed centrally within the top 20. The plug 32 is selectively positioned above the base 40 central reservoir 56 by installation of the top 20 onto the base 40. The bait syringe 70 is provided and has a delivery tube 72.

Referring to both FIG. 6 and FIG. 7, the access 33 is disposed within the plug 32. The access 33 is closed prior to delivery tube 72 insertion due to the rubberized quality of the plug 32. A liquid bait 14 is selectively injected through the plug 32 access 33 and into the central reservoir 56.

Referring again to FIGS. 3 and 6, solid bait 12 and get bait 13 can be added to the base 40 via top 20 lid lift or prior to top 20 attachment to the base 40.

With respect to the above description then, it is to be realized that the optimum dimensional relationships for the parts of the ant exterminator apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the ant exterminator apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the ant exterminator apparatus may be used.

Therefore, the foregoing is considered as illustrative only of the principles of the ant exterminator apparatus. Further, since numerous modifications and changes will readily occur to those skilled in the art, it is not desired to limit the ant exterminator apparatus to the exact construction and operation shown and described, and accordingly, all suitable modifications and equivalents may be resorted to, falling within the scope of the ant exterminator apparatus.

What is claimed is:

1. An ant exterminator apparatus comprising, in combination:
   a base;
   a plurality of spaced apart fasteners disposed upwardly around a perimeter of the base;
   a trio of reservoirs disposed upwardly within the base;
   an overlapping top removably fitted atop the base and selectively retained and held slightly above the base by the base fasteners;
   a pair of cutouts disposed within the top, the cutouts disposed above two reservoirs of the trio of reservoirs;
   a removable lid fitted within each cutout of the top;
   an indentation disposed in each lid;
   a rubberized plug disposed within the top above the remaining reservoir of the trio of reservoirs;
   a bait syringe having a delivery tube;
   an access within the plug, the access closed prior to delivery tube insertion;
   whereby a liquid is selectively injected through the plug access into the remaining reservoir of the trio of reservoirs.

2. The apparatus according to claim 1 wherein the top is opaque.

3. The apparatus according to claim 1 further comprising a t-receptacle disposed downwardly within the base, the t-receptacle having a first plurality of twist locks disposed within;
   a barbed stake having an upwardly connected neck with a t-insert;
   a second plurality of twist locks disposed on the t-insert;
   whereby the t-insert is selectively locked within and unlocked from the t-receptacle via the first and second plurality of twist locks.

4. The apparatus according to claim 1 further comprising a t-receptacle disposed downwardly within the base, the t-receptacle having a first plurality of twist locks disposed within;
  a barbed stake having an upwardly connected neck with a t-insert;
  a second plurality of twist locks disposed on the t-insert;
  whereby the t-insert is selectively locked within and unlocked from the t-receptacle via the first and second plurality of twist locks.

5. An ant exterminator apparatus comprising, in combination:
  a triangulated base having two adjacent straight edges and a curved edge connecting the straight edges;
  a plurality of spaced apart fasteners disposed upwardly around a perimeter of the base;
  a pair of spaced apart mirror image reservoirs disposed upwardly within the base, the mirror image reservoirs comprising a first reservoir disposed adjacent to one of the two straight edges and a second reservoir disposed adjacent to the other of the two straight edges;
  an arrowhead shaped central reservoir disposed upwardly within the base between the mirror image reservoirs;
  a barbed stake removably affixed downwardly from the base;
  a triangulated top removably fitted atop the base and selectively retained and held slightly above the base by the base fasteners, the top having two adjacent straight edges and a curved edge connecting the straight edges;
  a pair of mirror image cutouts disposed within the top, comprising a first cutout positioned above the first reservoir, a second cutout positioned above the second reservoir;
  a pair of mirror image lids fitted within the top, comprising a first lid removably fitted to the first cutout, a second lid removably fitted to the second cutout;
  an indentation disposed in each lid;
  a rubberized plug disposed centrally within the top, the plug positioned above the base central reservoir;
  a bait syringe having a delivery tube;
  an access within the plug, the access closed prior to delivery tube insertion;
  whereby a liquid is selectively injected through the plug access into the central reservoir.

6. The apparatus according to claim 5 wherein the top is opaque.

7. The apparatus according to claim 6 further comprising a t-receptacle disposed downwardly within the base, the t-receptacle having a first plurality of twist locks disposed within;
  a barbed stake having an upwardly connected neck with a t-insert;
  a second plurality of twist locks disposed on the t-insert;
  whereby the t-insert is selectively locked within and unlocked from the t-receptacle via the first and second plurality of twist locks.

8. The apparatus according to claim 5 further comprising a t-receptacle disposed downwardly within the base, the t-receptacle having a first plurality of twist locks disposed within;
  a barbed stake having an upwardly connected neck with a t-insert;
  a second plurality of twist locks disposed on the t-insert;
  whereby the t-insert is selectively locked within and unlocked from the t-receptacle via the first and second plurality of twist locks.

9. An ant exterminator apparatus comprising, in combination:
  a triangulated base having two adjacent straight edges with a straight edge length of about 6.5 inches and a curved edge connecting the straight edges, the curved edge having a base curved edge length of about 7.5 inches;
  a plurality of spaced apart fasteners disposed upwardly around a perimeter of the base;
  a pair of spaced apart mirror image reservoirs disposed upwardly within the base, the mirror image reservoirs comprising a first reservoir disposed adjacent to one of the two straight edges and a second reservoir disposed adjacent to the other of the two straight edges;
  an arrowhead shaped central reservoir disposed upwardly within the base between the mirror image reservoirs;
  a t-receptacle disposed downwardly within the base, the t-receptacle having a first plurality of twist locks disposed within;
  a barbed stake having an upwardly connected neck with a t-insert;
  a second plurality of twist locks disposed on the t-insert;
  whereby the t-insert is selectively locked within the t-receptacle via the first and second plurality of twist locks;
  a triangulated top removably fitted atop the base and selectively retained and held slightly above the base by the base fasteners, the top having two adjacent straight edges with a top straight edge length of about 7 inches and a curved edge connecting the straight edges, the curved edges having a curved edge length of about 8 inches;
  a pair of mirror image cutouts disposed within the top, comprising a first cutout positioned above the first reservoir, a second cutout positioned above the second reservoir;
  a pair of mirror image lids fitted within the top, comprising a first lid removably fitted to the first cutout, a second lid removably fitted to the second cutout;
  an indentation disposed in each of said mirror image lids;
  a rubberized plug disposed centrally within the top, the plug positioned above the base central reservoir;
  a bait syringe having a delivery tube;
  an access within the plug, the access closed prior to delivery tube insertion;
  whereby a liquid is selectively injected through the plug access into the central reservoir.

10. The apparatus according to claim 9 wherein the top is opaque.

* * * * *